United States Patent
Fukasawa et al.

(10) Patent No.: US 12,515,662 B2
(45) Date of Patent: Jan. 6, 2026

(54) CORRECTING DRIVING FORCE OF A SADDLE TYPE VEHICLE ACCORDING TO ATTITUDE OF A DRIVER

(71) Applicant: HITACHI ASTEMO, LTD., Hitachinaka (JP)

(72) Inventors: Yoshitaka Fukasawa, Tokyo (JP); Satoshi Matsuda, Tokyo (JP); Yuya Tanaka, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 265 days.

(21) Appl. No.: 18/255,405

(22) PCT Filed: Sep. 8, 2021

(86) PCT No.: PCT/JP2021/032932
§ 371 (c)(1),
(2) Date: Jun. 1, 2023

(87) PCT Pub. No.: WO2022/153592
PCT Pub. Date: Jul. 21, 2022

(65) Prior Publication Data
US 2024/0025408 A1    Jan. 25, 2024

(30) Foreign Application Priority Data
Jan. 12, 2021    (JP) ................ 2021-002963

(51) Int. Cl.
*B60W 30/165*    (2020.01)
*B60W 40/072*    (2012.01)
(Continued)

(52) U.S. Cl.
CPC ........ *B60W 30/165* (2013.01); *B60W 40/072* (2013.01); *B60W 40/08* (2013.01);
(Continued)

(58) Field of Classification Search
None
See application file for complete search history.

(56) References Cited

U.S. PATENT DOCUMENTS

| 6,370,470 B1 | 4/2002 | Yamamura et al. |
| 2018/0229725 A1 | 8/2018 | Akama et al. |

(Continued)

FOREIGN PATENT DOCUMENTS

| JP | 2001-047887 A | 2/2001 |
| JP | 2015-093624 A | 5/2015 |

(Continued)

OTHER PUBLICATIONS

International Search Report with English Translation and Written Opinion of International Patent Application No. PCT/JP2021/032932 dated Nov. 22, 2021 (12 pages).

*Primary Examiner* — Christian Chace
*Assistant Examiner* — Shayne M. Gilbertson
(74) *Attorney, Agent, or Firm* — Foley & Lardner LLP

(57) ABSTRACT

Provided is a vehicle control device capable of improving robustness against an attitude change of an occupant during preceding vehicle follow-up control in a straddle type vehicle such as a motorcycle. A vehicle control device 100 for a straddle type vehicle that controls a driving force during preceding vehicle follow-up control for causing an own vehicle to follow a preceding vehicle, in which the driving force (which is a control amount of the preceding vehicle follow-up control) is corrected according to an attitude (attitude change) of a driver detected by an attitude detection device 800 during the preceding vehicle follow-up control. Further, the driving force is corrected on the basis of the attitude, the driving torque of the own vehicle, and the acceleration of the own vehicle. In addition, the driving force (according to the attitude) is corrected from at least one of the own vehicle speed of the own vehicle, the target (Continued)

speed, the inter-vehicle distance between the own vehicle and the preceding vehicle, the target inter-vehicle distance, and the relative speed.

14 Claims, 8 Drawing Sheets

(51) Int. Cl.
*B60W 40/08* (2012.01)
*B60W 40/105* (2012.01)
*B60W 40/107* (2012.01)
*B60W 40/13* (2012.01)
*B60W 50/00* (2006.01)
*B60W 50/14* (2020.01)
*B62J 45/415* (2020.01)

(52) U.S. Cl.
CPC ........ *B60W 40/105* (2013.01); *B60W 40/107* (2013.01); *B60W 40/13* (2013.01); *B60W 50/14* (2013.01); *B62J 45/4151* (2020.02); *B60W 2050/0022* (2013.01); *B60W 2050/143* (2013.01); *B60W 2300/36* (2013.01); *B60W 2420/22* (2013.01); *B60W 2420/403* (2013.01); *B60W 2420/408* (2024.01); *B60W 2510/0657* (2013.01); *B60W 2520/105* (2013.01); *B60W 2530/10* (2013.01); *B60W 2530/16* (2013.01); *B60W 2540/223* (2020.02); *B60W 2552/30* (2020.02); *B60W 2554/802* (2020.02)

(56) References Cited

U.S. PATENT DOCUMENTS

2020/0171946 A1* 6/2020 Matsuda ............... B60W 30/16
2021/0309195 A1* 10/2021 Oshida ................. B60T 8/3225
2022/0169239 A1 6/2022 Nose et al.

FOREIGN PATENT DOCUMENTS

| JP | 2018-197071 A | | 12/2018 |
| JP | 2020100229 A | * | 7/2020 |
| WO | WO-2017/056401 A1 | | 4/2017 |
| WO | WO-2019/131113 A1 | | 7/2019 |
| WO | WO-2020/202278 A1 | | 10/2020 |

* cited by examiner

CORRECTING DRIVING FORCE OF A SADDLE TYPE VEHICLE ACCORDING TO ATTITUDE OF A DRIVER

TECHNICAL FIELD

The present invention relates to a vehicle control device that is mounted on a straddle type vehicle such as a motorcycle and performs follow-up traveling while keeping a safe inter-vehicle distance and a safe relative speed with respect to a preceding vehicle.

BACKGROUND ART

In order to reduce a burden on a driver (hereinafter, also referred to as a rider or an occupant) in a driving operation of a vehicle, a technique (Adaptive Cruise Control: ACC) is known by which an inter-vehicle distance and a relative speed with respect to a preceding vehicle are measured using a radar or a camera, and the preceding vehicle is automatically subjected to follow-up traveling without the driver operating an accelerator or a brake. In addition, there is known a technique of calculating and compensating the air resistance acting on the own vehicle from the vehicle speed, the air resistance coefficient of the vehicle, and the front projection area (PTL 1 below).

CITATION LIST

Patent Literature

PTL 1: JP 2001-47887 A

SUMMARY OF INVENTION

Technical Problem

However, unlike a four-wheeled vehicle, a two-wheeled vehicle that is a type of straddle type vehicle does not cover the occupant with a vehicle body or glass, so that the air resistance during traveling also changes depending on the attitude of the occupant. In addition, since the two-wheeled vehicle is lighter in weight than the four-wheeled vehicle, the attitude of the occupant greatly affects the air resistance during traveling. Therefore, in a case where the preceding vehicle follow-up control (ACC) of a four-wheeled vehicle is applied to a two-wheeled vehicle, controllability deteriorates when an occupant changes an attitude during operation.

The present invention has been made in view of the above circumstances, and an object thereof is to provide a vehicle control device capable of improving robustness against an attitude change of an occupant during preceding vehicle follow-up control in a straddle type vehicle such as a motorcycle.

Solution to Problem

In order to solve the above problem, a vehicle control device for a straddle type vehicle according to the present invention that controls a driving force during preceding vehicle follow-up control for causing an own vehicle to follow a preceding vehicle, in which the driving force is corrected according to an attitude of a driver detected by an attitude detection device during the preceding vehicle follow-up control.

Advantageous Effects of Invention

According to the present invention, it is possible to improve (improvement of actual inter-vehicle precision with respect to the target inter-vehicle distance and improvement of actual vehicle speed precision with respect to target vehicle speed) the robustness against the attitude change of the occupant during the preceding vehicle follow-up control.

Problems, configurations, and effects other than those described above will be clarified by the following description of embodiments.

DESCRIPTION OF EMBODIMENTS

Hereinafter, a vehicle control device according to an embodiment of the present invention will be described with reference to the drawings.

Figure 1:
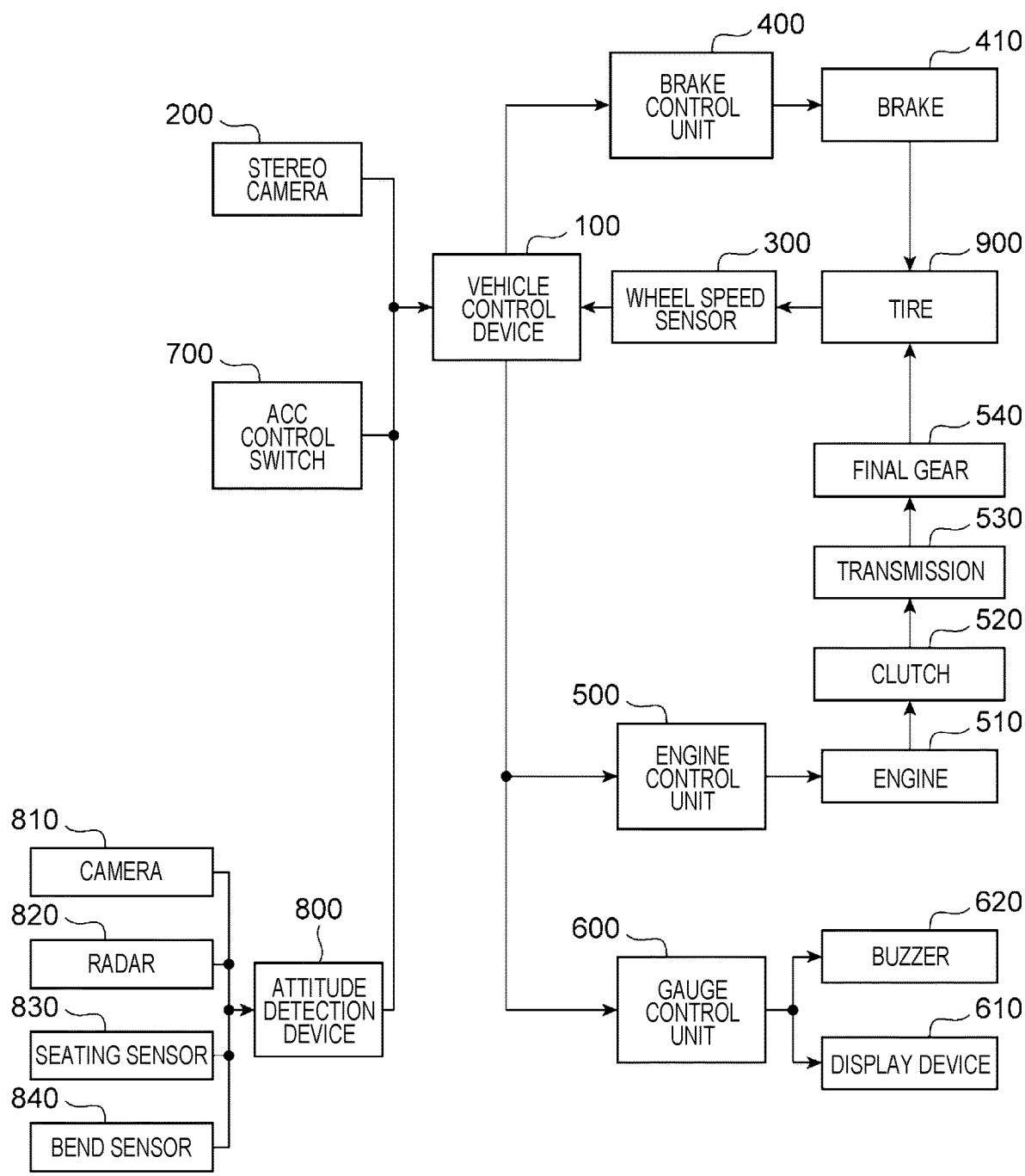
FIG. 1 is a system configuration block diagram of a vehicle with ACC.

FIG. 1 is a block diagram illustrating a system configuration of a vehicle including a vehicle control device according to an embodiment of the present invention. A vehicle control device 100 of the present embodiment is mounted on a straddle type vehicle (hereinafter referred to as a vehicle or an own vehicle) such as a motorcycle, and constructs a vehicle according to a block diagram as illustrated in FIG. 1.

A vehicle control device 100 is connected to a stereo camera 200, and the inter-vehicle distance from a preceding vehicle and the road curvature measured by the stereo camera 200 are transmitted to the vehicle control device 100 by communication.

The stereo camera 200 has a CCD camera (right) and a CCD camera (left), and inputs images obtained by the CCD camera (right) and the CCD camera (left) to image processing to measure the inter-vehicle distance from the preceding vehicle. The inter-vehicle distance from the preceding vehicle is transmitted to the vehicle control device 100 through a CAN (Car Area Network) bus of the vehicle through communication. In addition, images obtained by a CCD camera (right) and a CCD camera (left) are processed, and a road curvature ahead of the own vehicle is measured. The road curvature is also transmitted to the vehicle control device 100 through the CAN bus of the vehicle.

In addition, the vehicle control device 100 is connected to a wheel speed sensor 300 attached to the wheel, the wheel speed sensor 300 measures the rotation number of the tire 900, and the speed (own vehicle speed) of the own vehicle converted from the measured rotation number is transmitted to the vehicle control device 100. In addition, the vehicle control device 100 is connected to the ACC control switch 700, and determines the ACC control start, the ACC control release, and the set speed (set vehicle speed) during ACC traveling when the switch operation information of the driver is transmitted to the vehicle control device 100. With this configuration, the vehicle control device 100 calculates a control amount by obtaining the inter-vehicle distance from the preceding vehicle, the own vehicle speed (own vehicle speed), and the set speed (set vehicle speed) during ACC traveling.

In addition, the vehicle control device 100 calculates a control amount in the brake 410 and a control amount in the engine 510 on the basis of the calculated control amount, and determines a notification method for the driver.

The calculated control amount of the brake 410 is transmitted to a brake control unit 400 connected to the vehicle control device 100 through communication, and the brake control unit 400 operates the brake 410 which is an actuator and controls the deceleration of the vehicle using the frictional force applied to the tire 900.

Further, the control amount in the engine 510 is transmitted to an engine control unit 500 connected to the vehicle control device 100 through communication, and the engine control unit 500 controls the engine 510 on the basis of the control amount in the engine 510. The driving force generated by the engine 510 is boosted through a clutch 520, a transmission 530, and a final gear (sprocket) 540 and transmitted to the tire 900, whereby the acceleration of the vehicle is controlled.

Further, the notification method for the driver determined by the vehicle control device 100 is transmitted through communication to a gauge control unit 600 connected to the vehicle control device 100, so that the gauge control unit 600 warns the driver by sound using a buzzer 620 or notifies the driver of the control state using a display device 610.

In addition, the vehicle control device 100 is connected to an attitude detection device 800. The attitude detection device 800 receives outputs of a camera 810, a radar 820 and a seating sensor 830 mounted on the own vehicle, as well as a bending sensor 840 attached to clothes of an occupant of the own vehicle, and estimates a seated attitude of the occupant of the own vehicle. The attitude estimation result is transmitted to the vehicle control device 100. Any or a plurality of the camera 810, the radar 820, the seating sensor 830, and the bending sensor 840 may be mounted on the own vehicle.

The camera 810 is installed in the own vehicle such that a part of the body of the occupant is captured, and transmits the obtained video to the attitude detection device 800. The attitude detection device 800 infers the attitude of the occupant from the video. Since the attitude is inferred on the basis of the video, the attitude can be accurately inferred. When a drive recorder is mounted on the own vehicle, the camera 810 may also serve as the drive recorder.

The radar 820 is mounted on the own vehicle so that the occupant is within a detection range thereof, and transmits the acquired distance to the occupant (specifically, the measured distance from the steering wheel to the rider) to the attitude detection device 800. The attitude detection device 800 infers the attitude of the occupant from the distance. Unlike the camera 810, the radar 820 can detect the attitude of the occupant regardless of the illumination condition.

The seating sensor 830 is a sensor that is mounted on a seat of the own vehicle and can detect the position of the seat surface to which pressure is applied, and transmits the detection result to the attitude detection device 800. The attitude detection device 800 detects the attitude of the occupant from the position. When the seating sensor is mounted on the own vehicle for the purpose of realizing other functions, the seating sensor can also serve as the attitude detection device, and the attitude of the occupant can be detected without adding a sensor.

The bending sensor 840 is a sensor that is mounted at the elbow position of the clothes of the occupant and can detect the bending amount of the elbow position of the occupant, and wirelessly transmits the detection result to the attitude detection device 800. The attitude detection device 800 detects the attitude of the occupant from the bending amount. By using the bending sensor 840, the attitude of the occupant can be detected without adding a sensor on the vehicle body for detecting the attitude.

Note that the configuration of the vehicle (own vehicle) is not limited to the above-described example. For example, instead of the stereo camera 200, the surroundings of the own vehicle may be monitored by using an external recognition sensor such as a millimeter wave radar, a monocular camera, a sonar, or a laser radar, and the inter-vehicle distance and the relative speed with respect to the preceding vehicle may be measured. In addition, the road curvature ahead of the vehicle may be acquired from map information or the like. Alternatively, the own vehicle speed may be measured by a method other than the method using the wheel speed sensor 300. In addition, the vehicle may be an electric vehicle, a hybrid vehicle, a hydrogen vehicle, or the like other than the vehicle using the engine 510.

Next, functional details of the vehicle control device 100 illustrated in FIG. 1 will be described. Note that the vehicle control device 100 is configured as a microcomputer including a CPU, a ROM, a RAM, and the like therein, and the CPU executes various programs stored in the ROM, and information generated by the execution of the CPU is temporarily stored in the RAM. Although not illustrated, the vehicle control device 100 of the present embodiment includes an attitude detection unit that detects an attitude (attitude change) of the occupant, and a driving force control means that changes (controls) a driving force (specifically, acceleration including deceleration) during ACC traveling according to the attitude.

Figure 2:
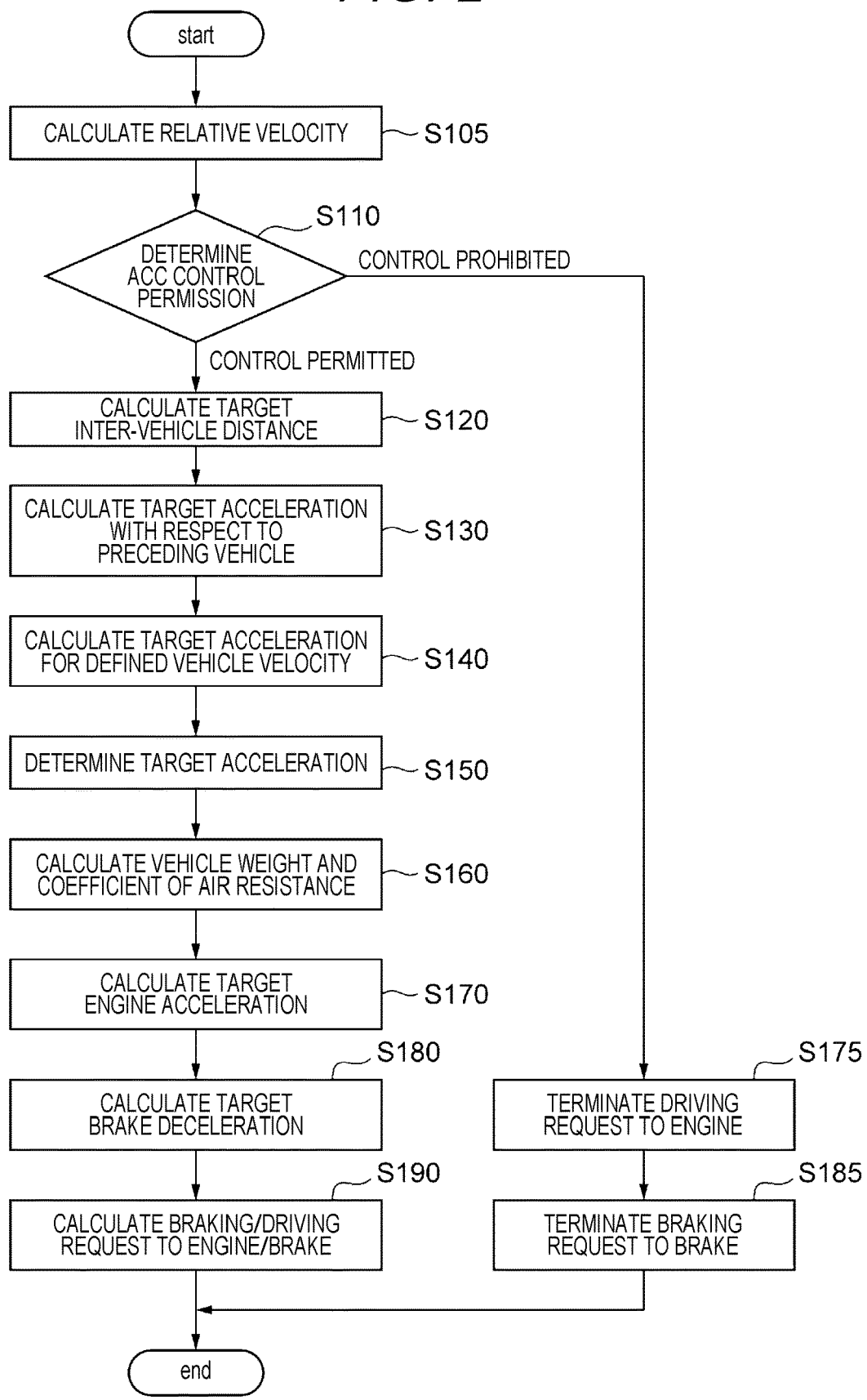
FIG. 2 is a flowchart of control command value calculation processing of ACC.

The acceleration control of the vehicle control device 100 will be described with reference to the flowchart of FIG. 2. In the processing of the vehicle control device 100, the processing illustrated in the flowchart of FIG. 2 is performed in a constant cycle, the inter-vehicle distance from the preceding vehicle, the set vehicle speed, and the own vehicle speed are received, and the processing illustrated in the flowchart of FIG. 2 is repeatedly executed to calculate the control amount of the ACC.

In the present description, symbols are defined as follows.

The speed of the own vehicle is Vh.

The speed of the preceding vehicle is Vp.

A relative speed with respect to the preceding vehicle is set to Vdiff, and a positive value is set to a direction away from the preceding vehicle.

The set vehicle speed is Vtgt.

The distance to the preceding vehicle is L.

The time headway is Th.

The distance to the preceding vehicle when the vehicle follows the preceding vehicle and then stops is defined as Loffset.

The target inter-vehicle distance is L_tgt.

The target acceleration is TgtA.

The target acceleration with respect to the preceding vehicle is TgtA_Pv.

The target acceleration with respect to the set vehicle speed is TgtA_Spd.

The target acceleration (target engine acceleration) on the drive control side to realize the target acceleration is TgtA_Drv.

The target deceleration (target brake deceleration) on the braking control side to realize the target acceleration is TgtA_Brk.

The acceleration generated in the vehicle by the engine brake is EgBrkAccel.

The driving torque request to the engine is DrvIrqReq_Eg. The brake fluid pressure request to the brake is BrkPrsReq_Brk.

An execution cycle of the acceleration control process is defined as Tc.

The ACC control by the vehicle control device 100 is executed from processing S105, and the relative speed Vdiff between the preceding vehicle and the own vehicle is calculated. Vdiff is obtained by time-differentiating L. Since the processing S105 is executed in a constant cycle, L is stored in a random access memory (RAM) or the like mounted on the vehicle control device 100, and a difference between L stored in the previous control cycle and the current L is obtained and divided by a cycle Tc to obtain Vdiff.

Next, in the ACC control permission determination S110, it is determined whether any one of the following states has been established and the ACC cannot be controlled.

A failure has occurred in the vehicle control device 100.
A failure has occurred in an external device (stereo camera 200, wheel speed sensor 300, brake control unit 400, engine control unit 500, gauge control unit 600, and the like) of the vehicle control device 100.
An image from the camera cannot be acquired (due to bad weather or dirt on the lens).
ACC is deactivated by switch operation.
The driver is operating the brake.
The clutch has been released for a certain period of time.
A certain time has elapsed with an inappropriate combination of gear positions with respect to the traveling speed.
The vehicle is traveling at an uncontrollable speed.
The steering angle is greater than or equal to a certain value.
The target acceleration TgtA is greater than or equal to a certain value, or less than or equal to a certain value.

In any of the above states, continuation of ACC is considered to be inappropriate, and ACC is terminated (control prohibited). In addition, in none of the above states, ACC is continued (control permitted). When it is determined in the determination S110 that ACC is to be terminated, the control is not to be performed by executing the processing S175 and the processing S185 to terminate the driving torque request DrvIrgReq_Eg to the engine which is the driving request to the engine and the brake fluid pressure request BrkPrsReq_Brk to the brake which is the braking request to the brake. At that time, an alarm is sounded using the buzzer 620 or a control state is notified using the display device 610 to notify the termination of ACC. By the ACC control permission determination based on the target acceleration (including the target deceleration) TgtA is greater than or equal to a certain value (greater than or equal to a predetermined upper limit value) or less than or equal to a certain value (less than or equal to a predetermined lower limit value), the occupant is prevented from being thrown off the own vehicle due to rapid acceleration/deceleration of the ACC.

When ACC continuation is determined in S110, processing S120 to processing S190 are executed.

In processing S120, the target inter-vehicle distance L_tgt is calculated by the following equation (1).

[Mathematical formula 1]

$$L\_tgt = Th \times Vp + Loffset \quad (1)$$

At this time, a numerical value from 1 to 3 seconds is set as Th, and a numerical value from 3 to 5 meters is set as Loffset. In addition, by providing a function of changing Th and Loffset according to the preference of the driver and the operation situation of the steering switch, traveling at an inter-vehicle distance matching the preference of the driver is enabled.

Vp used for the calculation of equation (1) can be obtained by (Vh+Vdiff).

Figure 3:
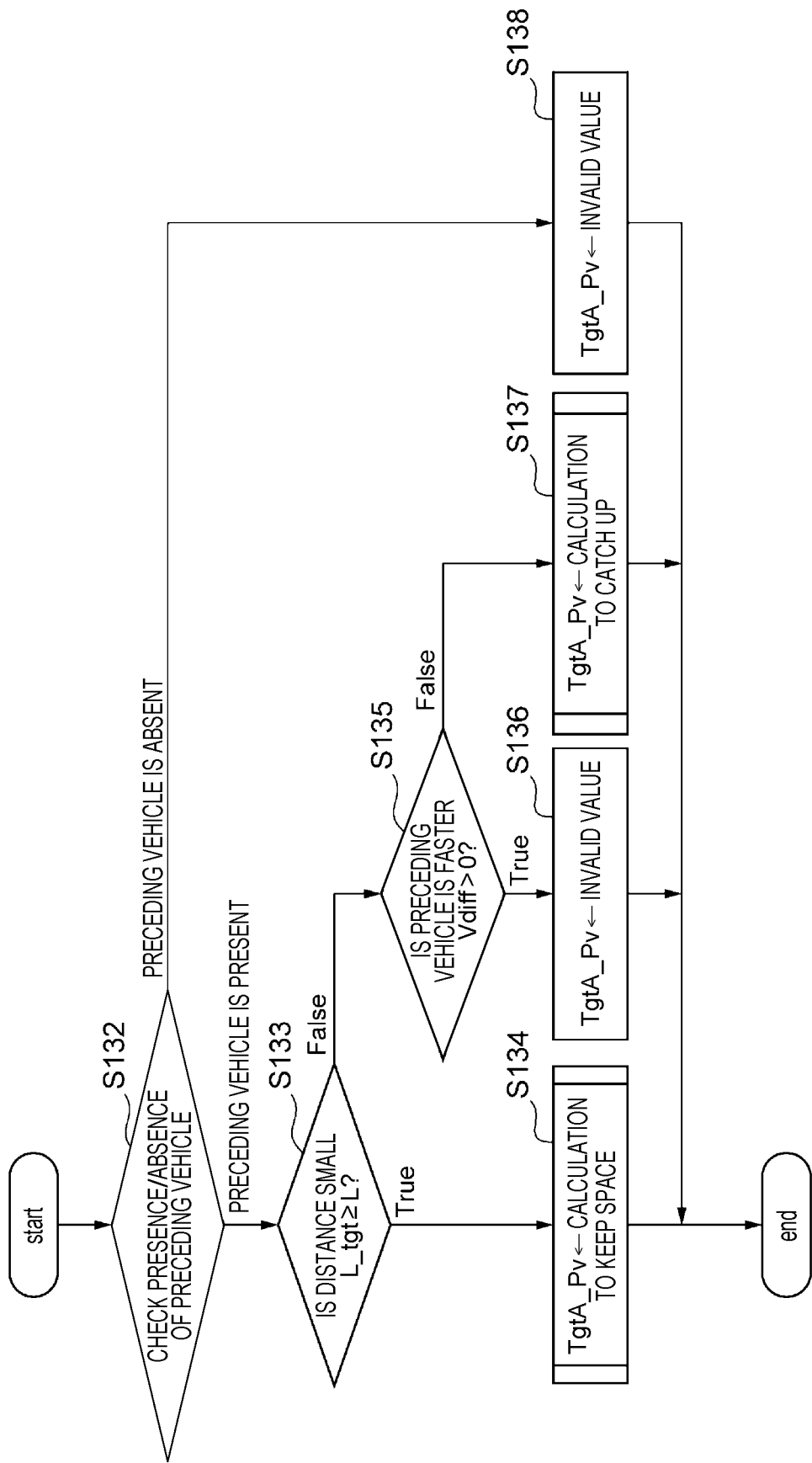
FIG. 3 is a flowchart of a process of calculating an acceleration with respect to a preceding vehicle.

Next, in processing S130, the target acceleration TgtA_Pv with respect to the preceding vehicle is calculated. Processing of calculating the target acceleration with respect to the preceding vehicle will be described with reference to the flowchart of FIG. 3.

TgtA_Pv switches the calculation method depending on the position and speed relationship with the preceding vehicle.

First, in determination S132, it is checked whether there is a preceding vehicle to be controlled, and in a case where there is no preceding vehicle, the process proceeds to processing S138, and TgtA_Pv is set to an invalid value. When the preceding vehicle is present, the process proceeds to determination S133 to determine whether the preceding vehicle is closer than the target inter-vehicle distance (L_tgt≥L). When the preceding vehicle is closer than the target inter-vehicle distance, a target acceleration for spacing is calculated and set to TgtA_Pv in processing S134. As a result of the determination S133, when the preceding vehicle is farther than the target inter-vehicle distance, it is determined in determination S135 whether the relative speed with respect to the preceding vehicle is a positive value, that is, whether the preceding vehicle is faster (Vdiff>0). In a case where the preceding vehicle is faster than the own vehicle, an invalid value is set to TgtA_Pv in processing S136.

As a result of the determination S135, when the preceding vehicle is slower, the target acceleration for catching up with the preceding vehicle is calculated and set to TgtA_Pv in processing S137.

Calculation of the target acceleration for spacing in processing S134 will be described below. The target acceleration TgtA_Pv Leave for spacing is calculated on the basis of a map value set in advance on the basis of Vdiff and a deviation between L_tgt and L. The map value is set as follows so that the speed can be controlled by continuously changing the acceleration control such that the speed is decreased while approaching the preceding vehicle, the speed is decreased while spacing apart from the preceding vehicle, the acceleration is performed while spacing apart from the preceding vehicle, and the relative speed with respect to the preceding vehicle is set to zero.

The speed is reduced while approaching the preceding vehicle according to the relative speed with respect to the preceding vehicle.
Skipping a situation in which the vehicle reduces speed while spacing apart from the preceding vehicle, the vehicle is controlled to accelerate while spacing apart from the preceding vehicle.
Alternatively, the map value may be switched according to the seated attitude. For example, in a case where the preceding vehicle and the own vehicle rapidly approach each other (in other words, the difference in relative speed is large, and the inter-vehicle distance is rapidly approaching the target inter-vehicle distance) when the seated attitude is an attitude to decrease the travel resistance, such as the forward tilting attitude, the deceleration command can be intensified using a map value for further decreasing the target acceleration. As a result, even if the seated attitude changes and the travel resistance decreases, the accuracy of the actual inter-vehicle distance with respect to the target inter-vehicle distance can be improved.

Target acceleration calculation for catching up in processing S137 will be described below. The target acceleration TgtA_Pv_Approach for catching up is performed by the following calculation formula (2).

[Mathematical formula 2]

$$TgtA\_Pv\_Approach = -Vdiff2/\{2 \times (L\_tgt-L)\} \quad (2)$$

A target acceleration for catching up is calculated by setting TgtA_Pv to an invalid value when L is not shorter than a deceleration start threshold L_Thr, and by setting TgtA_Pv_Approach to TgtA_Pv when L is shorter than the deceleration start threshold L_Thr, so that the preceding vehicle starts deceleration from a long distance and the preceding vehicle accelerates during the deceleration, so that the own vehicle is re-accelerated and ride comfort is not deteriorated. Normally, when the deceleration start threshold L_Thr is set to a value around 70 m to 130 m with a behavior when the driver drives without using ACC as a guide, control with less discomfort is performed. In addition, the deceleration start threshold may be variable depending on the own vehicle speed or the like.

In processing S140 of FIG. 2, the target acceleration TgtA_Spd with respect to the set vehicle speed (also referred to as a target vehicle speed) is calculated by the following equation (3).

[Mathematical formula 3]

$$TgtA\_Spd = K \times (Vtgt - Vh) \quad (3)$$

K in the above equation (3) is a positive constant and is set to 0.001-0.02. In addition, when K is set to a variable value such as a large value when accelerating and a small value when decelerating, it is easy to perform driving with good fuel efficiency without using a brake for deceleration. When Vh is fast, safety can be enhanced by setting K to a variable value such that the acceleration command is weak and the deceleration command is strong. In addition, in a case where the deviation between Vtgt and Vh is large when the seated attitude is an attitude to decrease the travel resistance, such as the forward tilting attitude, the deceleration command can be intensified by increasing K. As a result, even if the seated attitude changes and the travel resistance decreases, the actual vehicle speed accuracy with respect to the target vehicle speed can be improved. As described above, it is desirable to adjust K as a variable value according to the stability of the vehicle and the preference tendency of the driver.

In processing S150, the target acceleration TgtA is determined. The target acceleration TgtA is set to TgtA by comparing TgtA_Pv calculated in processing S130 with TgtA_Spd calculated in processing S140 and selecting a smaller one, that is, a more decelerated one. In addition, in a case where TgtA_Pv is set to an invalid value, TgtA_Pv is ignored, TgtA_Spd is selected, and TgtA is set. Since the behavior of the vehicle becomes unstable when the value of TgtA rapidly changes, it is desirable to smooth the change in the value of TgtA by limiting the change amount (change rate) or using a first-order lag filter. Furthermore, it is desirable that the change amount limitation on the acceleration side is strengthened by giving priority to good ride comfort, and the change amount limitation on the deceleration side is made difficult to accelerate and easy to decelerate by loosening the limitation by giving priority to safety. In addition, in a case where the target acceleration TgtA is excessive in both the acceleration side and the deceleration side, the occupant may be shaken off, and thus the upper and lower limits are limited. That is, the change amount of TgtA is limited such that the change amount of TgtA (corresponding to the change amount of the driving force) is within a predetermined value. In addition to limiting the change amount of TgtA, TgtA is held in a RAM or the like in order to determine continuation of ACC in determination S110.

Figure 4:
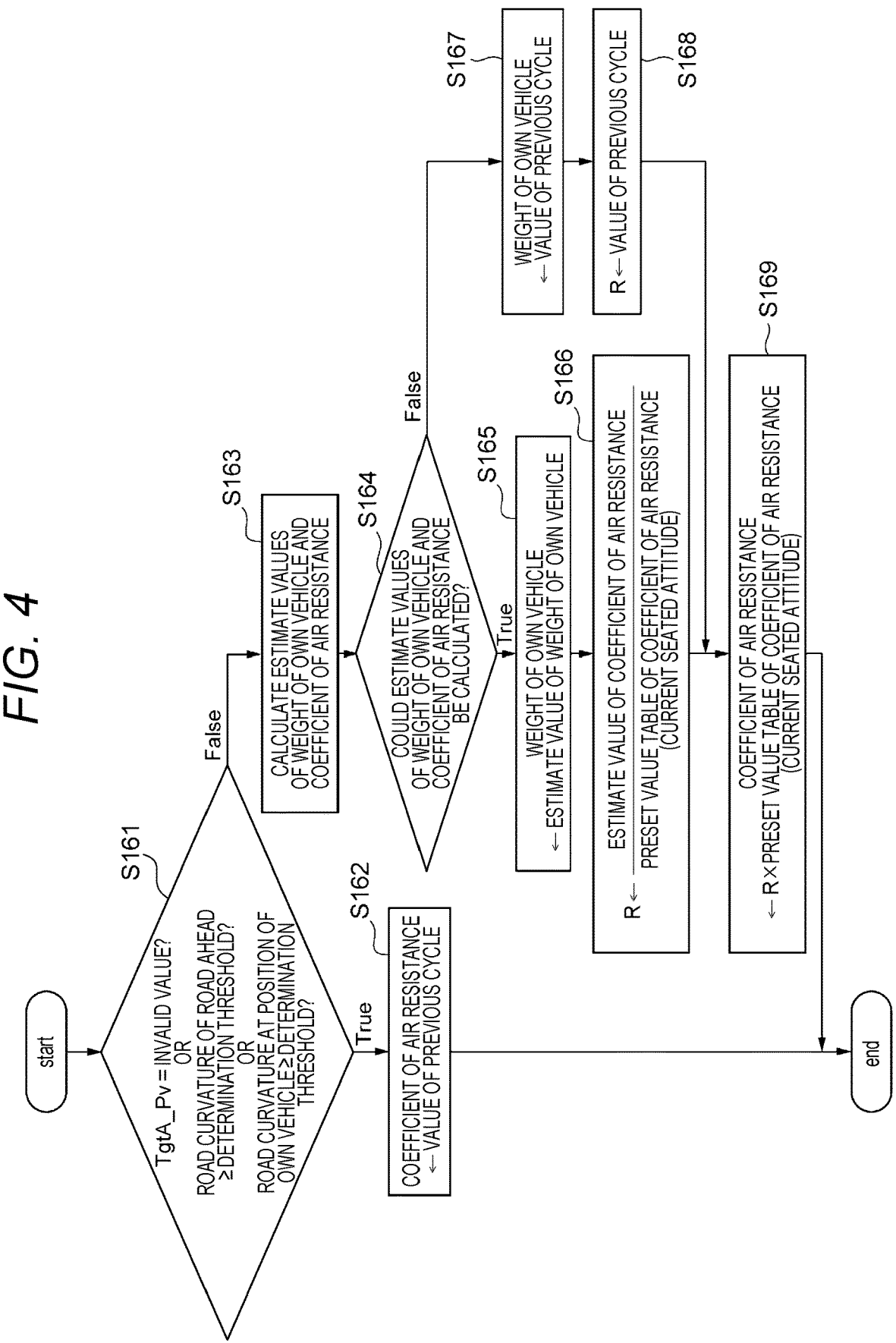
FIG. 4 is a flowchart of a process of calculating a coefficient of air resistance.

In processing S160, the current weight (vehicle weight) of the own vehicle and the coefficient of air resistance are calculated. The processing S160 will be described with reference to FIG. 4.

First, in determination S161, it is determined whether the target acceleration TgtA_Pv with respect to the preceding vehicle is an invalid value, the forward road curvature is a determination threshold or greater (there is a certain curvature or greater on the traveling path ahead of the own vehicle), or the road curvature at the position of the own vehicle is a determination threshold or greater (there is a certain curvature or greater on the traveling path on which the own vehicle is traveling). If the determination in determination S161 is True, the coefficient of air resistance is set to the same value as that of previous control cycle in processing S162 so as not to change. As a result, the following effects can be obtained. That is, when there is no preceding vehicle, or when the inter-vehicle distance from the preceding vehicle is greater than or equal to the target inter-vehicle distance and the preceding vehicle is faster, the risk of collision with the preceding vehicle is small. Therefore, the correction of the driving force instruction or the braking force instruction according to the seated attitude is stopped, and the change in the command values of the driving force and the braking force of the ACC based on the change in the seated attitude is suppressed to reduce the discomfort of the occupant. In addition, when the own vehicle starts turning or is turning (that is, when there is a curvature greater than or equal to a certain degree on the traveling path ahead of the own vehicle or the traveling path on which the own vehicle is traveling), since the occupant balances the bank angle of the vehicle, the correction of the driving force instruction or the braking force instruction according to the seated attitude is stopped, and the change in the command value of the driving force and the braking force of the ACC based on the change in the seated attitude is suppressed so that the occupant does not lose the balance of the vehicle.

If the determination in determination S161 is False, an estimated value of the weight and the coefficient of air resistance of the own vehicle is calculated in processing S163.

Figure 5:
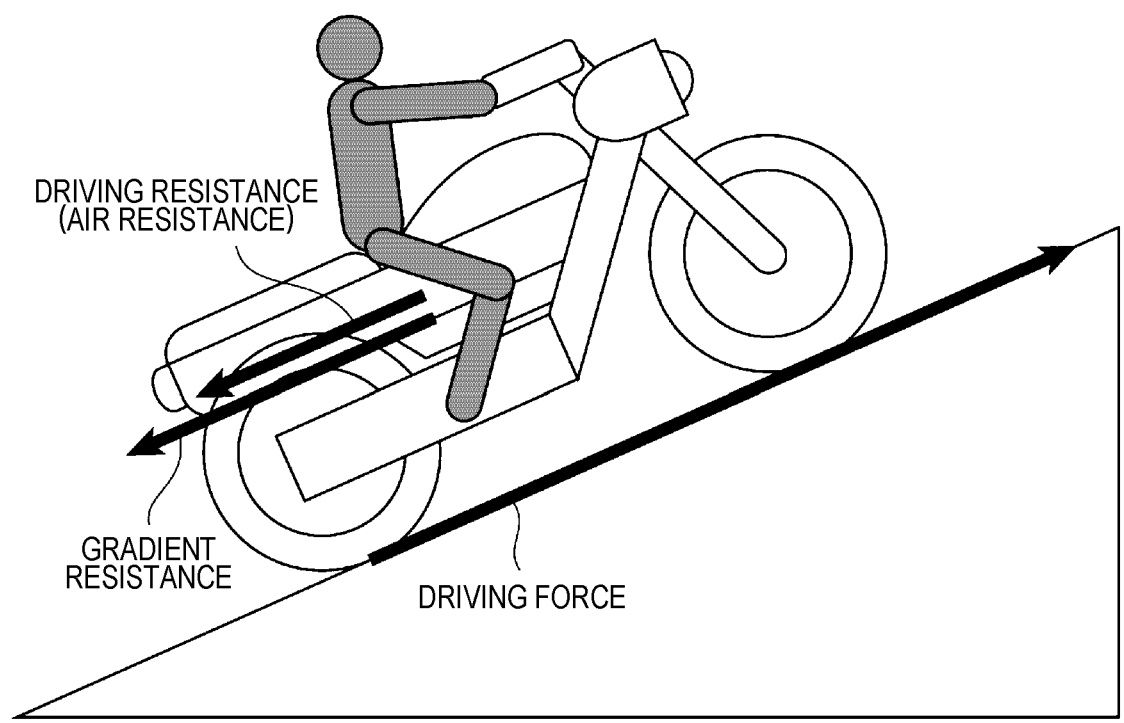
FIG. 5 is a diagram of force acting on the two-wheeled vehicle during traveling.

The processing S163 will be described with reference to FIG. 5. When the force in the front-rear direction acting on the vehicle is defined as the driving force (driving torque) generated by the engine 510 and applied to the tire 900 through the clutch 520, the transmission 530, and the final gear 540, the gradient resistance due to the road surface gradient, and the travel resistance (air resistance), the equation of motion regarding the force in the front-rear direction acting on the vehicle is as in the following equation (4).

[Mathematical formula 4]

$$\begin{aligned}&(\text{Weight of Own Vehicle})\times(\text{Own Vehicle Acceleration})=(\text{Driving Force})+(\text{Gradient Resistance})+\\&(\text{Travel Resistance})=(\text{Driving Force})+(\text{Weight of Own Vehicle})\times(\text{Slope Direction Component of Gravitational Acceleration})+(\text{Coefficient of Air Resistance})\times(\text{Own Vehicle Speed})\times(\text{Own Vehicle Speed})\end{aligned} \quad (4)$$

In the above equation (4), the own vehicle acceleration can be calculated from the differential value of the wheel speed, and the slope direction component of the gravitational acceleration can be calculated from the comparison between the value of the longitudinal acceleration sensor mounted on the own vehicle and the differential value of the wheel speed. As a result, the unknowns are the weight of the own vehicle and the coefficient of air resistance, and if the own vehicle acceleration, the slope direction component of the gravity acceleration, and the own vehicle speed can be obtained in two different control cycles during traveling, the weight of the own vehicle and the coefficient of air resistance can be estimated. The own vehicle acceleration, the slope direction component of the gravity acceleration, the own vehicle speed, and the past value of the seated attitude output from the attitude detection device 800 are held in a RAM or the like, and the weight of the own vehicle and the coefficient of air resistance are calculated in processing S163 using the own vehicle acceleration when the seated attitude is the same as the current value, the slope direction component of the gravity acceleration, the past value of the own vehicle speed, the current own vehicle acceleration, the gradient resistance, and the own vehicle speed. For the calculation result, allowable upper and lower limits are set in advance, and when the calculation result is out of the range, limitation is applied. For example, the weight of the own vehicle is limited by setting the weight of the vehicle+ the weight when one driver gets on the vehicle as the lower limit, and the total weight of the vehicle as the upper limit.

In determination S164, it is determined whether the coefficients of the weight and the air resistance of the own vehicle have been calculated, and if True, in processing S165, the weight of the own vehicle is set to the estimated value of the weight of the own vehicle calculated in processing S163. When the result of determination S164 is False, in processing S167, the weight of the own vehicle is set to the same value as that of the previous control cycle.

When the determination result in determination S164 is True, the correction gain R for absorbing the difference in the magnitude of the air resistance due to the occupant's physique is calculated in processing S166. The vehicle control device 100 has in advance a preset value table of coefficients of air resistance as initial values of the coefficients of air resistance. The preset value table of the coefficient of air resistance is a table corresponding to seated attitudes when an occupant of a standard physique is assumed. In processing S166, the occupant's seated attitude output from the attitude detection device 800 is first read, and a preset value of the air resistance coefficient corresponding to the current seated attitude is calculated from the preset value table of the air resistance coefficient. When the seated attitude is a discrete value, the air resistance coefficient may be selected according to the seated attitude, and when the seated attitude is a continuous value, the air resistance coefficient may be obtained by linear interpolation. Next, the estimated value of the coefficient of air resistance calculated in processing S163 is compared with the preset value table of the coefficient of air resistance according to the current seated attitude, and the magnification is set to R. R represents a difference between the standard physique of the occupant and the actual physique of the occupant. If R is greater than 1, it means that the actual physique of the occupant is larger than the standard physique of the occupant, and if R is smaller than 1, it means that the actual physique of the occupant is smaller than the standard physique of the occupant. When the result of determination S164 is False, the correction gain R of the physique of the occupant is set to the same value as that of the previous control cycle in processing S168.

According to processing S166, the vehicle control device 100 can calculate the difference between the standard physique of the occupant and the actual physique of the occupant (as the correction gain R), and according to processing S168, even if the estimated value of the coefficient of the current air resistance cannot be calculated in processing S163 for some reason, the occupant physique information so far can be kept.

Figure 6:
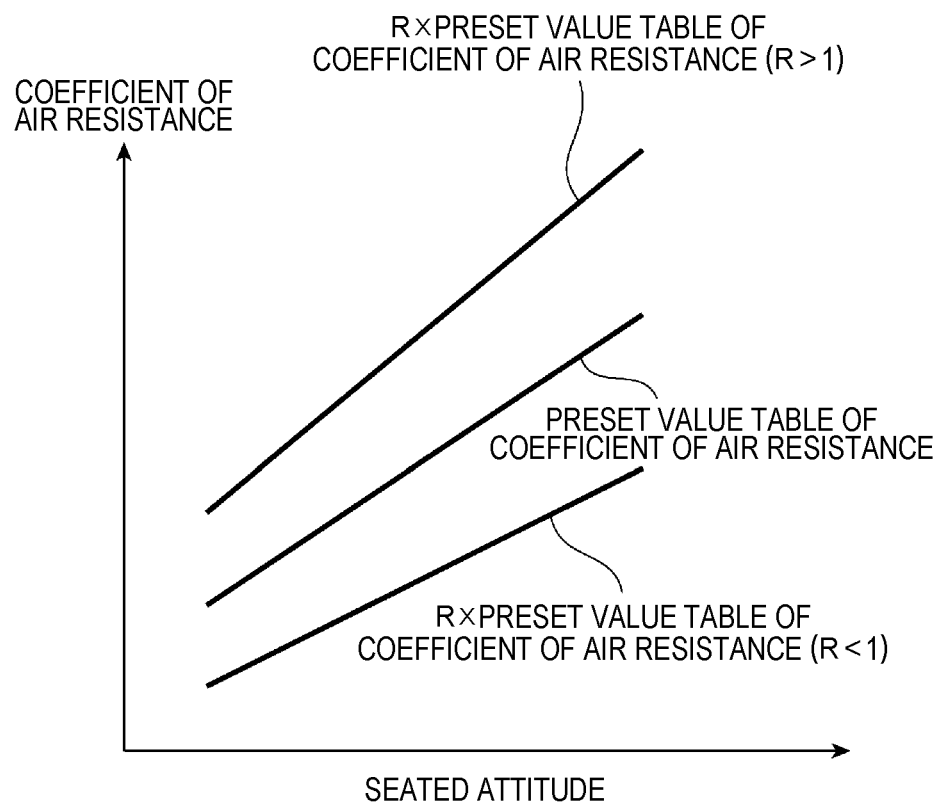
FIG. 6 is a diagram showing a preset value table of coefficients of air resistance.

In processing S169, a coefficient of air resistance is calculated. First, the preset value table of the coefficient of air resistance is multiplied by the correction gain R of the physique of the occupant to calculate a preset value table of the coefficient of air resistance according to the current (actual) physique of the occupant. If R is greater than 1, it is assumed that the actual physique of the occupant is larger than the standard physique of the occupant, and the entire preset value table of the coefficient of air resistance is calculated to be larger. If R is smaller than 1, it is assumed that the actual physique of the occupant is smaller than the standard physique of the occupant, and the entire preset value table of the coefficient of air resistance is calculated to be smaller (see FIG. 6). Finally, the coefficient of air resistance corresponding to the current seated attitude is calculated from the preset value table of the coefficient of air resistance multiplied by R on the basis of the seated attitude of the occupant read from the attitude detection device 800. When the seated attitude is a discrete value, the air resistance coefficient may be selected according to the seated attitude, and when the seated attitude is a continuous value, the air resistance coefficient may be obtained by linear interpolation.

Thus, in processing S160, the coefficient of air resistance can be calculated in consideration of both the attitude and the physique of the occupant. Even if the result of determination S164 is False and the correction gain R for the coefficient of air resistance cannot be updated, the coefficient of air resistance can be calculated in consideration of the attitude of the occupant using the correction gain R for the physique of the occupant so far.

By calculating the current weight (vehicle weight) of the own vehicle and the coefficient of air resistance acting on the own vehicle in this processing S160, it is possible to calculate the travel resistance (air resistance) in consideration of the attitude of the occupant, which affects the acceleration/deceleration (driving force) of the vehicle, in the subsequent processes.

In processing S170, the target engine acceleration TgtA_Drv is calculated.

Figure 7:
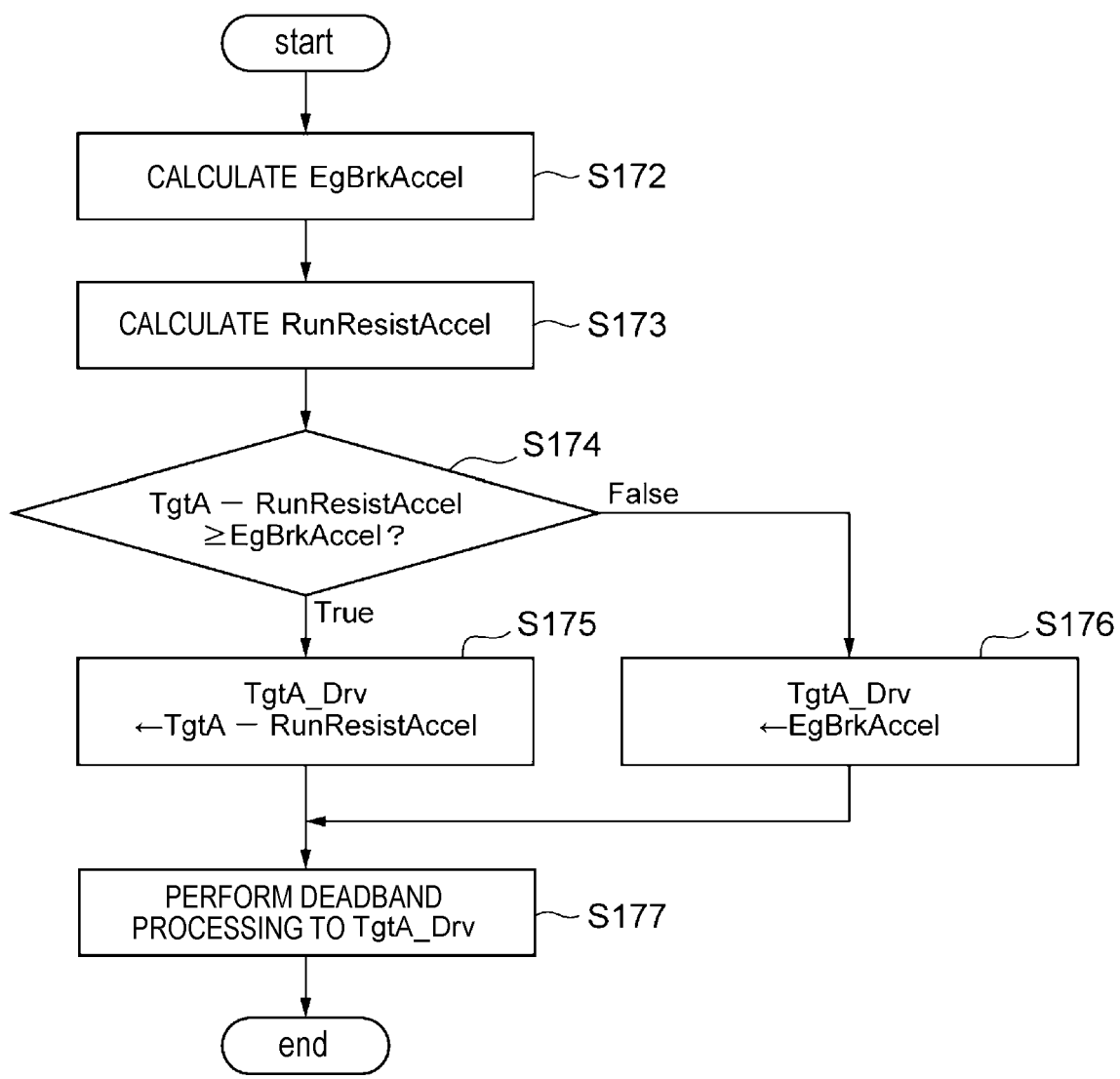
FIG. 7 is a flowchart of a process of calculating a target engine acceleration.

The target engine acceleration TgtA_Drv is calculated on the basis of the target acceleration TgtA calculated in the processing S150. The processing S170 will be described with reference to FIG. 7.

First, in processing S172, the acceleration EgBrkAccel generated in the vehicle by the engine brake is calculated.

EgBrkAccel sets a value which is defined according to specifications of an engine and a transmission and a gear ratio according to Vh. Next, in processing S173, an acceleration RunResistAccel by the travel resistance is calculated. The travel resistance is calculated using the coefficient of air resistance calculated in processing S160, and Vh. In addition, the gradient of the road surface calculated from the comparison between the value of the longitudinal acceleration sensor mounted on the vehicle and the differential value of the wheel speed is added as the gradient resistance to the travel resistance. Next, in determination S174, it is determined whether a value obtained by subtracting the acceleration RunResistAccel due to the travel resistance from the target acceleration TgtA, that is, a value obtained by correcting the target acceleration TgtA for the travel resistance in order to realize the target acceleration TgtA for the own vehicle is larger or smaller than the acceleration EgBrkAccel generated in the vehicle by the engine brake, and it is determined whether the target acceleration TgtA can be realized with the acceleration that can be operated by the output control of the engine. In a case where it is determined in the determination S174 that the target acceleration TgtA can be realized with the acceleration operable by the output control of the engine, a value obtained by subtracting the acceleration RunResistAccel by the travel resistance from the target acceleration TgtA is set to TgtA_Drv in the processing S175. In a case where it is determined in the determination S174 that the target acceleration TgtA cannot be realized with the acceleration that can be operated by the output control of the engine, the acceleration EgBrkAccel generated in the vehicle by the engine brake is set to TgtA_Drv in the processing S176. Then, in processing S177, a deadband is set in TgtA_Drv, and the discomfort given to the driver due to the vibration generated in the vehicle body due to the minute fluctuation of the driving force in the engine is reduced.

In processing S180, a target brake deceleration TgtA_Brk is calculated.

Figure 8:
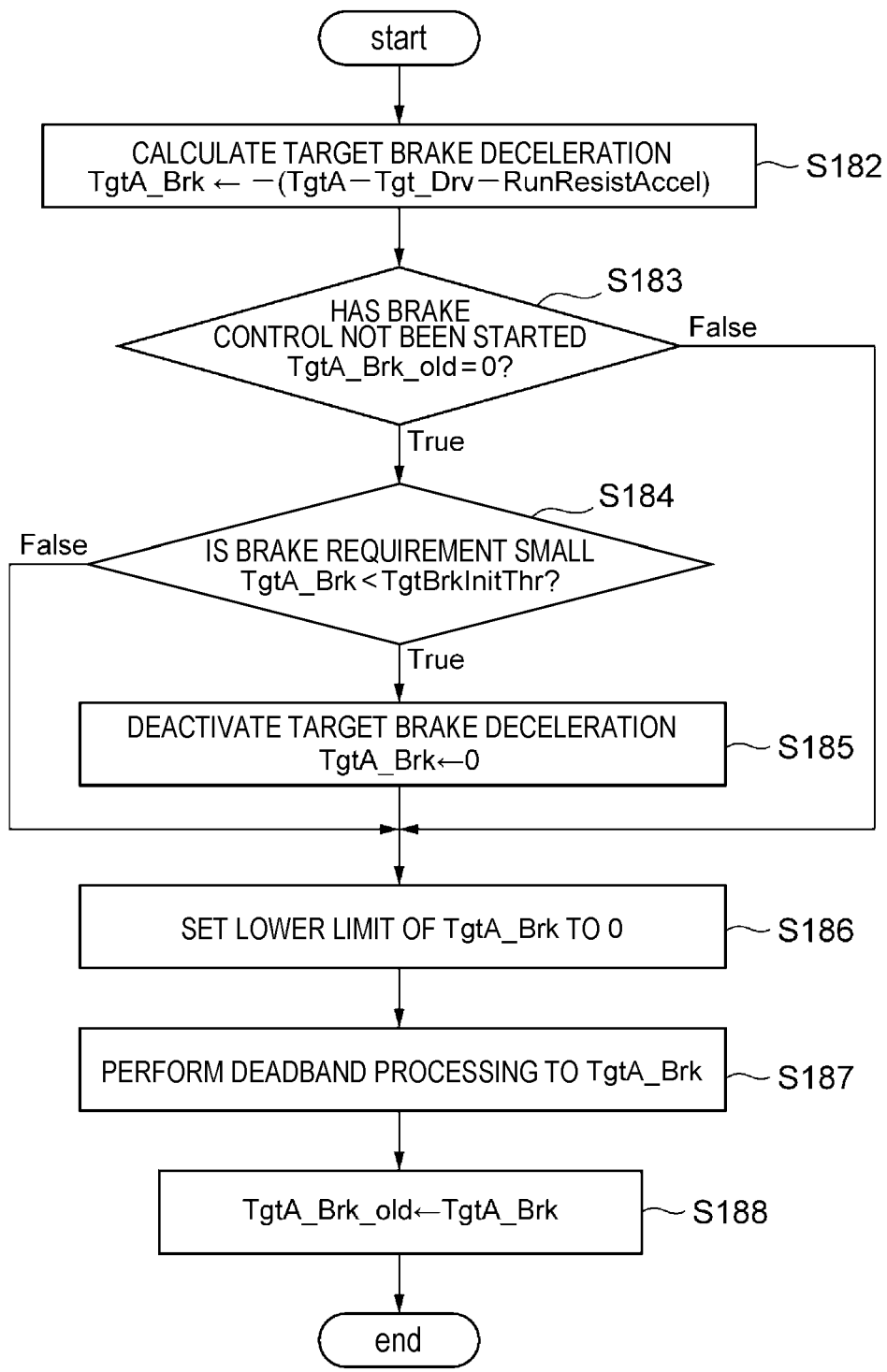
FIG. 8 is a flowchart of a process of calculating a target brake deceleration.

The target brake deceleration TgtA_Brk is calculated on the basis of the target acceleration TgtA calculated in processing S150, the acceleration RunResistAccel by the travel resistance calculated in processing S173, and the target engine acceleration TgtA_Drv calculated in processing S170. The processing S180 will be described with reference to FIG. 8.

First, in processing S182, TgtA_Drv and RunResistAccel are subtracted from TgtA to invert the sign, and the target brake deceleration TgtA_Brk required for the brake is calculated. Next, in determination S183 and determination S184, it is determined whether the brake request is a weak brake smaller than the threshold of TgtABrkInitThr when the control of the brake has not been started. When the conditions of determination S183 and determination S184 are both satisfied, TgtA_Brk calculated in processing S182 is set to 0 and invalidated in processing S185. By performing the series of processes of determination S183, determination S184, and processing S185, the operating state of the brake is continued, the phenomenon at the time of traveling of the vehicle due to the repeated operation and termination does not occur, and the ride comfort is improved. At this time, the threshold value TgtABrkInitThr is set as a constant value, and if the threshold value is too large, the deceleration start is delayed and sudden braking is likely to occur. On the other hand, if the thickness is too small, rattling of the vehicle cannot be suppressed. Therefore, it is desirable to set the value by limiting the value according to the brake performance and stability of the vehicle.

Next, in processing S186, limit processing with 0 as a lower limit is performed on TgtA_Brk to prevent an acceleration request from being erroneously issued to the brake. Next, in processing S187, by setting a deadband to TgtA_Brk, the discomfort given to the driver due to the generation of the vibration in the vehicle body due to the minute fluctuation of the output of the brake is reduced, and the target deceleration (target brake deceleration) TgtA_Brk is set as a target on the braking control side in order to realize the target acceleration. In processing S188, in order to determine the start of the brake control in determination S183, TgtA_Brk is held in the RAM or the like (as TgtA_Brk old).

In processing S190, a driving torque request DrvIrqReq_Eg to the engine and a brake fluid pressure request BrkPrsReq_Brk to the brake are calculated. The driving torque request DrvIrqReq_Eg to the engine is calculated in consideration of the weight of the own vehicle, the tire radius, and the transmission gear ratio of the transmission on the basis of the target engine acceleration TgtA_Drv indicated in the processing S170. The brake fluid pressure request to the brake BrkPrsReq_Brk is calculated by converting the brake fluid pressure into the brake fluid pressure in consideration of the weight and brake characteristics of the own vehicle on the basis of the target brake deceleration TgtA_Brk indicated in the processing S180.

In addition to the control of the acceleration illustrated in FIG. 2, the vehicle control device 100 performs communication processing of generating display information to be presented to the driver and transmitting the display information by communication in controlling the ACC.

In the process of generating the display information, the switch information obtained from the ACC control switch 700, and information indicating whether ACC is being controlled based on the determination result of the determination S110. In addition, control information such as preceding vehicle detection information by the stereo camera 200 (whether or not a preceding vehicle to be controlled can be detected by the stereo camera 200) and a set vehicle speed used in processing S140 is set as display information.

In the communication process, BrkPrsReq_Brk calculated as a brake fluid pressure request to the brake is transmitted to the brake control unit 400, DrvIrgReq_Eg calculated as a driving torque request to the engine is transmitted to the engine control unit 500, and the display information generated in the process of generating the display information is transmitted to the gauge control unit 600.

The ACC control switch 700 is installed at a place where the driver can easily operate during driving, such as a switch installed on a steering wheel of the vehicle or a lever attached to a steering column, and is used to start ACC control of the driver, release ACC control, and change a set speed during ACC traveling. The ACC control switch 700 includes a switch for starting ACC, a switch for terminating ACC, a switch for changing a set speed during ACC traveling, and a switch for changing an inter-vehicle distance from a preceding vehicle during ACC traveling as necessary.

The brake control unit 400 controls the brake 410 using BrkPrsReq_Brk transmitted from the vehicle control device 100.

The engine control unit 500 controls the engine 510 using DrvIrqReq_Eg transmitted from the vehicle control device 100.

The gauge control unit 600 controls the display device 610 and the buzzer 620 according to the display information communicated from the vehicle control device 100, and gives an alarm to the driver and notifies the driver of a control state.

As described above, the vehicle control device 100 of the present embodiment corrects the driving force (which is the control amount of the preceding vehicle follow-up control) according to the attitude (attitude change) of the driver detected by the attitude detection device 800 during the preceding vehicle follow-up control in the vehicle control device 100 of the straddle type vehicle that controls the driving force during the preceding vehicle follow-up control in which the own vehicle follows the preceding vehicle.

Further, the vehicle control device 100 corrects the driving force on the basis of the attitude, the driving torque of the own vehicle, and the acceleration of the own vehicle. In addition, the vehicle control device 100 corrects the driving force (according to the attitude) from at least one of the own vehicle speed of the own vehicle, the target speed, the inter-vehicle distance between the own vehicle and the preceding vehicle, the target inter-vehicle distance, and the relative speed.

According to the present embodiment, it is possible to improve (improvement of actual inter-vehicle precision with respect to the target inter-vehicle distance and improvement of actual vehicle speed precision with respect to target vehicle speed) the robustness against the attitude change of the occupant during the preceding vehicle follow-up control.

Next, modifications of the vehicle control device 100 according to one embodiment of the present invention will be described.

In the above embodiment, a sensor or the like outside the vehicle control device 100 is used as the attitude detection device 800, but a configuration of not using these components is also possible. For example, on a road surface having no gradient change, the vehicle control device 100 may calculate a disturbance amount estimated from a difference between an acceleration (estimated own vehicle acceleration) assumed from an actual engine driving force and an acceleration (actual own vehicle acceleration actually generated in the vehicle) obtained from longitudinal G sensor values, and may detect the attitude (attitude change) based on whether or not the amount of when the disturbance amount suddenly changes corresponds to the attitude change of the occupant. Then, from the attitude (attitude change) detected using the difference between the estimated own vehicle acceleration and the actual own vehicle acceleration as described above, the acceleration (driving force) control which is the control amount of the ACC can be realized. In addition, in the above embodiment, the air resistance amount for correcting the target acceleration is calculated by changing the coefficient of air resistance according to the seated attitude, but the target acceleration may be corrected by the disturbance amount after the seated attitude is detected according to the disturbance amount. As a result, it is possible to realize the configuration of the present embodiment while suppressing the cost without adding a sensor outside the vehicle control device 100.

Although the above embodiment describes a two-wheeled vehicle as the straddle type vehicle, the application scope is not limited only to two-wheeled vehicles, and is effective in a vehicle in which the seated attitude affects air resistance. Therefore, the application scope is not limited to two-wheeled vehicles such as a three-wheeled motorcycle including two front wheels and one rear wheel, a three-wheeled motorcycle including one front wheel and two rear wheels, and a four-wheeled motorcycle including two front wheels and rear wheels.

The present invention is not limited to the above-described embodiments, and encompasses various modifications. For example, the above-described embodiments have been described in detail for the sake of comprehensible explanation of the present invention, and are not necessarily limited to those provided with all the described configurations.

In addition, some or all of the above-described configurations, functions, processing units, processing means, and the like may be embodied by hardware, for example, by designing on an integrated circuit. In addition, each of the above-described configurations, functions, and the like may be embodied by software by a processor interpreting and executing a program realizing each function. Information such as a program, a table, and a file for realizing each function can be stored in a storage device such as a memory, a hard disk, and a solid-state drive (SSD), or a recording medium such as an IC card, an SD card, and a DVD.

In addition, only the control lines and the information lines considered to be necessary for the description are shown, and not necessarily all the control lines and the information lines in the product are shown. In practice, it may be considered that almost all the configurations are connected to each other.

REFERENCE SIGN LIST

100 vehicle control device
200 stereo camera
300 wheel speed sensor
400 brake control unit
410 brake
500 engine control unit
510 engine
520 clutch
530 transmission
540 final gear
600 gauge control unit
610 display device
620 buzzer
700 ACC control switch
800 attitude detection device
810 camera
820 radar
830 seating sensor
840 bending sensor
900 tire

The invention claimed is:

1. A vehicle control device for a straddle type vehicle that controls a driving force during preceding vehicle follow-up control for causing an own vehicle to follow a preceding vehicle, wherein
    the driving force is corrected according to an attitude of a driver detected by an attitude detection device during the preceding vehicle follow-up control, and
    the driving force is corrected on a basis of the attitude, driving torque of the own vehicle, and an acceleration of the own vehicle.

2. The vehicle control device according to claim 1, wherein
    the driving force is corrected on a basis of at least one of: an own vehicle speed of the own vehicle; a target speed; an inter-vehicle distance between the own vehicle and the preceding vehicle; a target inter-vehicle distance; or a relative speed.

3. The vehicle control device according to claim 1, wherein
the driving force is corrected on a basis of an estimated own vehicle acceleration estimated from the driving force and an actual own vehicle acceleration actually generated in the own vehicle.

4. The vehicle control device according to claim 1, wherein
a change amount of the driving force is limited to be within a predetermined value.

5. The vehicle control device according to claim 1, wherein
when a target deceleration or a target acceleration of the own vehicle is greater than or equal to a predetermined upper limit value or less than or equal to a predetermined lower limit value, an alarm is issued and the preceding vehicle follow-up control is terminated.

6. The vehicle control device according to claim 1, wherein
when a traveling path ahead of the own vehicle or a traveling path on which the own vehicle is traveling has a curvature of a certain degree or more, correction of a driving force instruction according to the attitude is stopped.

7. The vehicle control device according to claim 2, wherein
when the inter-vehicle distance from the preceding vehicle is greater than or equal to the target inter-vehicle distance and a speed of the preceding vehicle is greater than a speed of the own vehicle, correction of a driving force instruction according to the attitude is stopped.

8. The vehicle control device according to claim 1, wherein
the driving force is corrected by calculating a coefficient of air resistance according to a current seated attitude during the preceding vehicle follow-up control.

9. The vehicle control device according to claim 1, wherein
the vehicle control device
calculates an estimated value of a weight of the own vehicle and a coefficient of air resistance acting on the own vehicle;
compares the estimated value of the coefficient of air resistance with a preset value table of a coefficient of air resistance according to a current seated attitude when an occupant of a standard physique is assumed, and calculates a correction gain representing a difference between the standard physique of the assumed occupant and an actual physique of the occupant;
multiplies the preset value table of the coefficient of air resistance by the correction gain of the physique of the occupant to calculate a preset value table of the coefficient of air resistance according to the actual physique of the occupant; and
corrects the driving force by calculating a coefficient of air resistance according to the current seated attitude during the preceding vehicle follow-up control from a preset value table of the coefficient of air resistance multiplied by the correction gain on a basis of the current seated attitude.

10. The vehicle control device according to claim 1, wherein
the attitude detection device estimates the attitude from a camera mounted on the own vehicle.

11. The vehicle control device according to claim 1, wherein
the attitude detection device measures a distance from a steering wheel to a driver by a radar mounted on the own vehicle to estimate the attitude.

12. The vehicle control device according to claim 1, wherein
the attitude detection device estimates the attitude from a seating sensor mounted on the own vehicle.

13. The vehicle control device according to claim 1, wherein
the attitude detection device estimates the attitude from a bending amount of an elbow of the driver by a bending sensor on clothes of the driver.

14. The vehicle control device according to claim 1, wherein
the attitude detection device estimates the attitude on a basis of an estimated own vehicle acceleration estimated from the driving force and an actual own vehicle acceleration actually generated in the own vehicle.

* * * * *